United States Patent
Peters (10) Patent No.: US 9,639,403 B2
(45) Date of Patent: May 2, 2017

(54) RECEIVE-SIDE SCALING IN A COMPUTER SYSTEM USING SUB-QUEUES ASSIGNED TO PROCESSING CORES

(71) Applicant: Genband US LLC, Frisco, TX (US)

(72) Inventor: Matthew Lorne Peters, Kanata (CA)

(73) Assignee: GENBAND US LLC, Frisco, TX (US)

( * ) Notice: Subject to any disclaimer, the term of this patent is extended or adjusted under 35 U.S.C. 154(b) by 223 days.

(21) Appl. No.: 13/833,049

(22) Filed: Mar. 15, 2013

(65) Prior Publication Data
US 2014/0281349 A1    Sep. 18, 2014

(51) Int. Cl.
*G06F 9/52* (2006.01)
*G06F 9/50* (2006.01)

(52) U.S. Cl.
CPC ............ *G06F 9/526* (2013.01); *G06F 9/5027* (2013.01); *G06F 2209/522* (2013.01); *G06F 2209/548* (2013.01)

(58) Field of Classification Search
CPC .. G06F 9/526; G06F 9/5027; G06F 2209/548; G06F 2209/522
See application file for complete search history.

(56) References Cited

U.S. PATENT DOCUMENTS

| | | | |
|---|---|---|---|
| 7,529,242 B1* | 5/2009 | Lyle | 370/392 |
| 2006/0047856 A1* | 3/2006 | Tripathi | H04L 67/1002 709/250 |
| 2006/0182031 A1* | 8/2006 | Tran | 370/235 |
| 2006/0227788 A1* | 10/2006 | Eldar et al. | 370/395.4 |
| 2012/0311606 A1* | 12/2012 | Marathe | G06F 9/526 718/107 |

* cited by examiner

Primary Examiner — Arpan P. Savla
(74) Attorney, Agent, or Firm — Haynes and Boone, LLP (57) ABSTRACT

A system, method, and computer program product are provided for receiving an incoming data stream. The system comprises a multi-core processor with a memory unit that is configured to include a circular queue that receives a data stream. The circular queue is divided into a plurality of sub-queues determined as a multiple of the number of processing cores, and each sub-queue is assigned to one processing core such that as data is received into a region covered by a particular sub-queue, the processing core assigned to the particular sub-queue processes the data. The system is also configured to update a head pointer and a tail pointer of the circular queue. The head pointer is updated as data is received into the circular queue and the tail pointer is updated by a particular processing core as it processes data in its assigned sub-queue.

20 Claims, 7 Drawing Sheets

RECEIVE-SIDE SCALING IN A COMPUTER SYSTEM USING SUB-QUEUES ASSIGNED TO PROCESSING CORES

TECHNICAL FIELD

The present description relates, in general, to computer systems that pass data units and, more specifically, to techniques for distributing reception of data unit across multiple processors or processor cores.

BACKGROUND

In computer networks utilizing high bit rates, single processors are not able to process the volume of data as it arrives. As a result, a bottleneck is formed as data is received. To improve a computer's ability to process data received at high bit rates, a number of processes have been developed.

One such process is Receive Side Scaling ("RSS"). RSS is typically implemented as a function of a particular Network Interface Card ("NIC") in hardware and tends to be limited to the capabilities available from the NIC. RSS functions implemented by a NIC may be deficient in several ways such as, for example, limited support for packet parsing, failing when presented with packets that are tunneled, failing when presented with packets that are fragmented, or failing when presented with unknown packet or protocol types.

Some technologies have been developed to improve a NIC's deficiencies in RSS processing. Some of these technologies include Network Processing Units (NPUs) with specialized packet scheduling hardware, dedicated hardware or software based load balancing, and embedding switching/routing devices in the NIC.

Network Processing Units ("NPU") with specialized packet scheduling hardware have a dedicated hardware function that schedules packets on each of the packet processing cores. This function is also typically used to schedule and order egress frames to prevent out of order packets. This solution scales well, but suffers from the same limitations as a NIC RSS function. This method usually fails gracefully by scheduling all packets in a total-order manner. NPUs are typically much more expensive than a general purpose processor and add significant cost versus other methods.

Dedicated hardware or software based load balancers offer a localized solution. These work by offloading the distribution of received data to a centralized system or a set of blades that performs the packet parsing and hashing function. This has the benefit of being scalable and customizable but is only feasible where the traffic can be routed through this external load balancing device. This method, however, introduces a choke point in the system for both scalability and reliability and is expensive since dedicated resources are used. Further, this mechanism also does not fully eliminate the need for RSS functionality in processing packets in multicore processors since packets marked for delivery to a particular core are still parsed and distributed directly to a particular target core.

Embedded switching/routing devices are developed as a hybrid of NPUs and dedicated load balancers. These devices are embedded directly on a multicore processor and perform parsing, hashing, marking and delivery functionality. These devices, however, add cost and complexity to each of the packet handling systems and can contradict a desire to implement a lower cost general purpose multicore processor.

The approaches listed above do not provide a cost-effective, easily scalable method of processing data received at high bit rates.

BRIEF DESCRIPTION OF THE DRAWINGS

The present disclosure is best understood from the following detailed description when read with the accompanying figures.

SUMMARY

According to one embodiment, a system comprises a multi-core processor with a memory unit that is configured to include a circular queue that receives a data stream. The circular queue is divided into a plurality of sub-queues determined as a multiple of the number of processing cores, and each sub-queue is assigned to one processing core such that as data is received into a region covered by a particular sub-queue, the processing core assigned to the particular sub-queue processes the data. The system is also configured to update a head pointer and a tail pointer of the circular queue. The head pointer is updated as data is received into the circular queue and the tail pointer is updated by a particular processing core as it processes data in its assigned sub-queue.

According to another embodiment, a computer-implemented method is discloses for receiving an incoming data stream. The method divides a circular queue in a memory unit into multiple sub-queues. The number of sub-queues is determined as a multiple of a number of processing cores and each sub-queue includes an equal portion of the circular queue. Each multiple of sub-queues is sequentially assigned to a different processing core. The method then receives the data stream into the circular queue. The circular includes a head pointer that indicates the front of the queue is updated based on the amount of data received into the queue. As data is received in the circular queue, it determined whether a tail pointer of the circular queue is within a region of a particular sub-queue. When the tail pointer is within the region of the particular sub-queue, the data in the particular sub-queue is retrieved by the processing core assigned to the particular sub-queue. The processing core assigned to the next subsequent sub-queue is then notified that retrieving of the data in the particular sub-queue is complete.

According to another embodiment, a computer program product having a computer readable medium tangibly recording computer program logic for maintaining data unit order by a data producing unit is disclosed. The computer program product includes code that carries out the method described above.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments include systems, methods, and computer program products for processing data received at high bit rates. The embodiments according to the present disclosure can be used in packet networks and can augment receive side processing of RSS functions known in the art. Various embodiments can be implemented in software on general purpose processors having multiple cores. This allows for scalable, low cost solutions as network devices handle ever increasing data bit rates.

A concept disclosed herein includes dividing a receive queue used by an RSS process into multiple sub-queues or logical queues. Each logical queue is assigned to a processing core of a multi-core processor and the assigned processing core performs operations such as, for example, hashing the data and placing the data into work queues. This spreads the processing or received data over multiple cores and allows the computing system to receive data at higher bit rates.

In one example, a networked computing device includes a multi-core processor with eight processing cores. The receive queue used in RSS or similar operations is divided into multiple sub-queues or logical queues based on a multiple of the number of processing cores. In other words, the receive queue may be divided into 32 equally sized logical queues with each processing core assigned to four logical queues. The logical queues may be assigned to a processing core sequentially so each core has a turn in processing part of the receive queue before being called upon to again process part of the receive queue. This is explained in more detail below with respect to FIGS. 1-3. While eight processors and 32 logical queues are used in this example, these numbers are merely exemplary and are not intended to limit the embodiments in any way.

Figure 1:
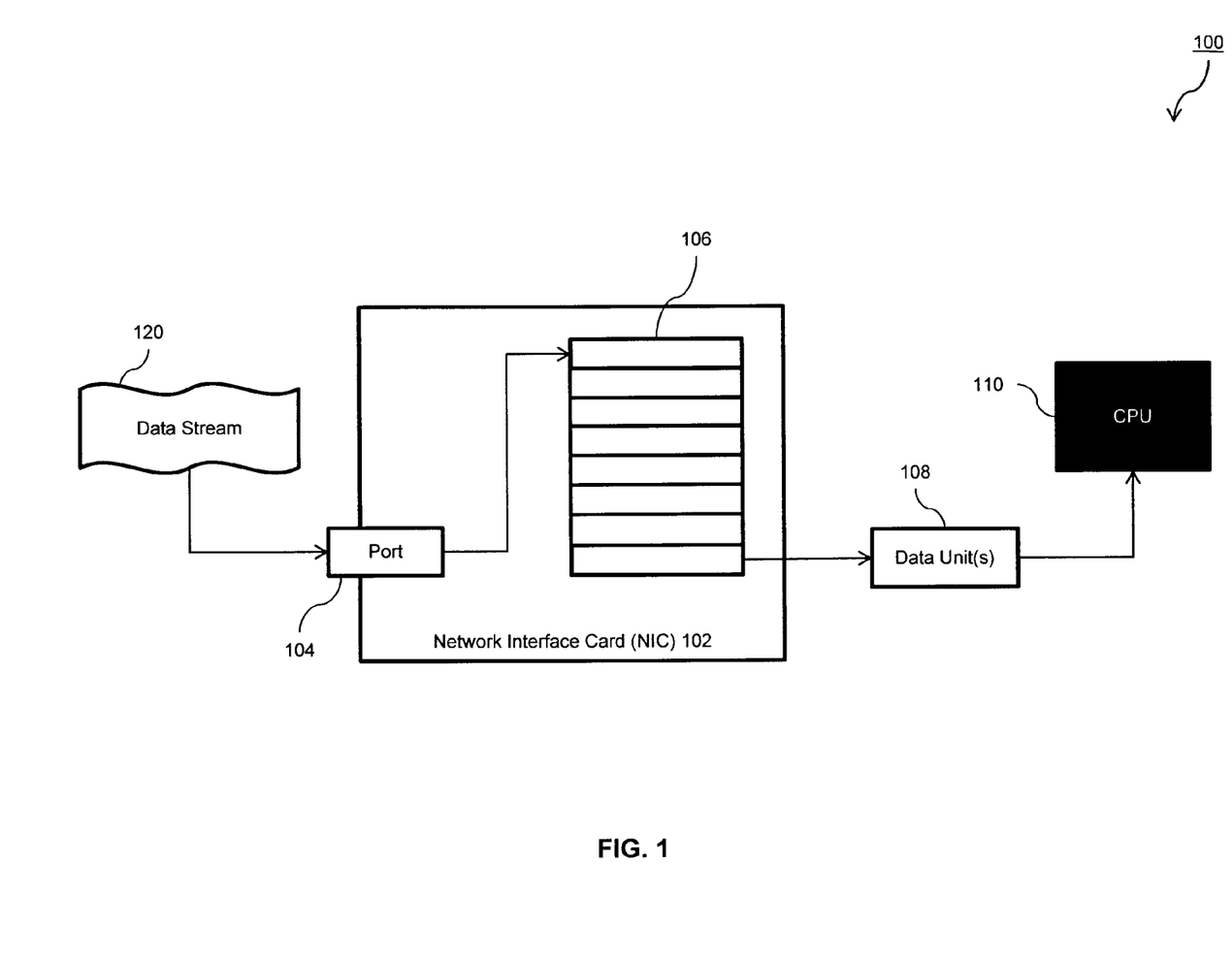
FIG. 1 illustrates an example process flow of an incoming data stream.

FIG. 1 illustrates an example process flow 100 of an incoming data stream. Process flow 100 shows the process of how a Network Interface Card ("NIC") such as, for example, NIC 102 processes an incoming data stream. NIC 102 includes port 104 and receive queue 106. An incoming data stream such as, for example, data stream 120 is received into NIC 102 through port 104. NIC 102 then adds the incoming data stream to receive queue 106. Data in receive 106 is represented as data unit 108. Data unit 108 is processed in turn by CPU 110. Because NIC 102 is powered by a single processing unit (not shown) and receive queue 106 is of fixed or limited size, NIC 102 can only receive data stream 120 as fast as CPU 110 can process the data units on receive queue 106.

Figure 2A:
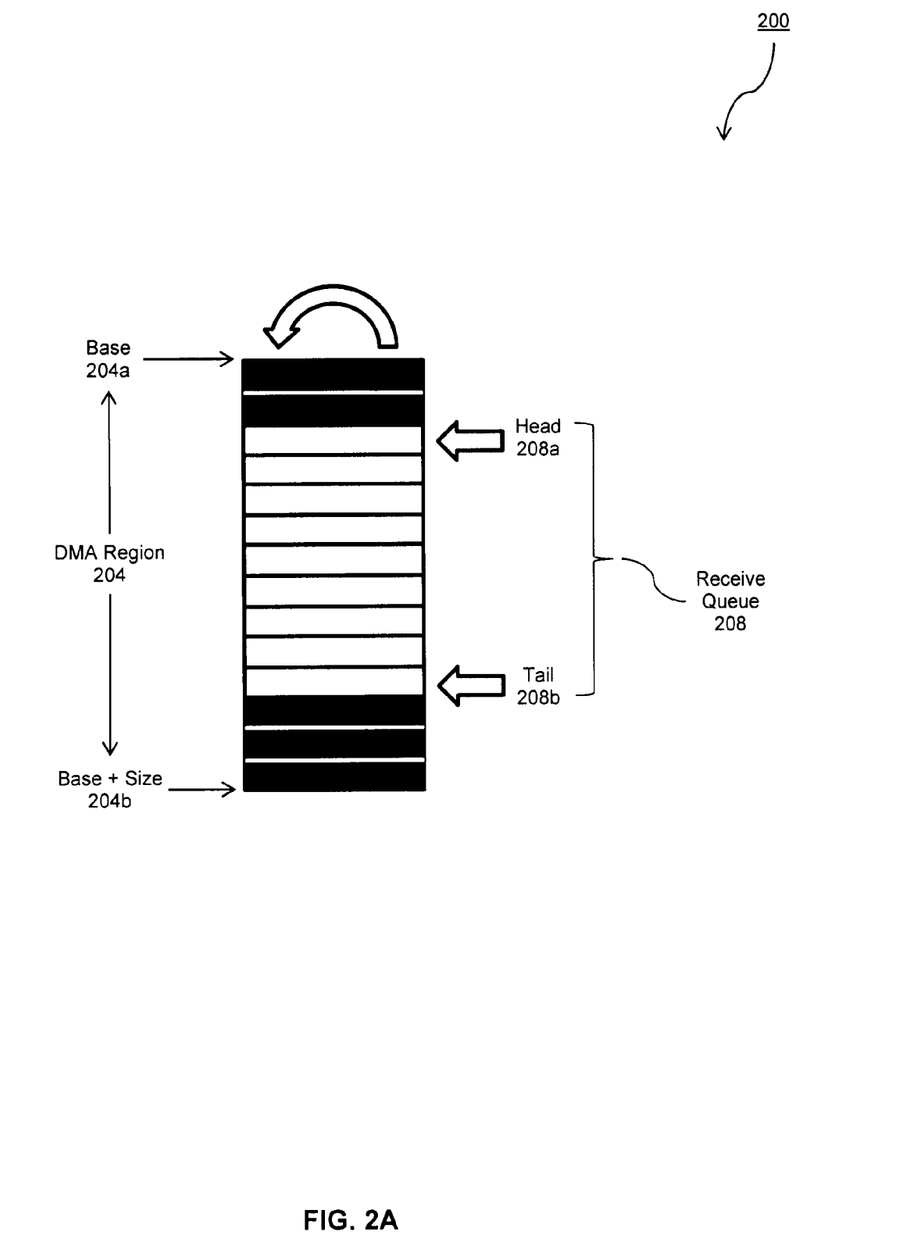
FIG. 2A illustrates an example memory block utilized by a receive process.

FIG. 2A illustrates an example memory block 200 used by a typical NIC as described in FIG. 1. Memory block 200 includes Direct Memory Access ("DMA") region 204 that is bounded by locations 204a and 204b. DMA region 204 allows a NIC to directly load received data into the region. Location 204a defines the base of DMA region 204 and location 204b defines the base plus the size of the DMA region. Within DMA region 204 is receive queue 208. Receive queue 208 is one example of a receive queue 106 in FIG. 1. Receive queue 208 includes head 208a and tail 208b. Head 208a is updated by the NIC and points to the data most recently loaded into the DMA region by the NIC. Tail 208b points to the next index to be processed by the receive process. As data units are hashed and indexed, the NIC updates the head to point to the newly added entry to be processed by the receive process.

Since receive queue 208 is of fixed or limited size, the NIC can only place data into the queue as long as head 208a does not overrun tail 208b. Thus, the rate at which data is received at least partially depends on the rate at which the receive function retrieves data already in the queue. Typical receive processes utilize a single processing core for retrieving each receive queue, and the system is only able to receive packets as fast as the single processor can process the entries in the receive queue. As a result, these receive functions cannot typically handle high performance NICs, for example, NICs that receive data at rates above 10 Gbps.

Figure 2B:
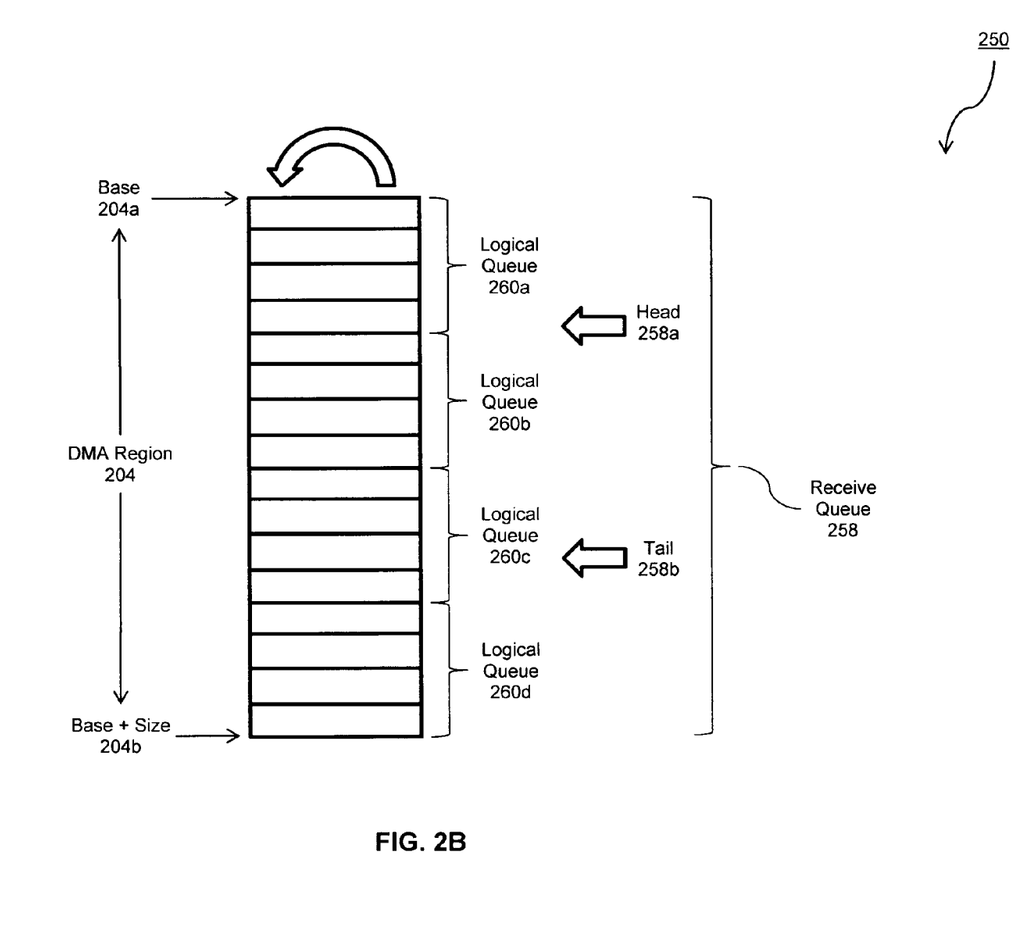
FIG. 2B illustrates an example memory block utilized by the embodiments described herein.

FIG. 2B illustrates an example memory block 250 utilized by the embodiments described herein that enables data to be processed as it is received by a high performance NIC. Similar to receive queue in 208 in FIG. 2A, receive queue 258 includes a head 258a and a tail 258b. Additionally, receive queue 258 is within DMA region 204. Unlike receive queue 208, however, receive queue 258 is divided into multiple sub-queues or logical queues 260a-d. Instead of a single processor receiving packets as in FIG. 2A, logical queues 260a-d allow for multiple processors or processing cores to receiving incoming packets from a single queue.

For receive queue 258, for example, multiple processing cores of a multi-core processor are assigned to one or more logical queues. The extent to which receive queue 258 is divided into logical queues may be determined, for example, as a multiple of the number of processors or processing cores available to process incoming data. For example, if a multi-core processor has four processing cores available to process receive queue 258, receive queue 258 may be divided into 64 logical queues or 16 logical queues for each of the 4 processing cores. This example is not intended to limit the embodiments since a different number of logical queues may be created and each processing core may be assigned to a different number of logical queues. Further, in FIG. 2B, while only four logical queues 260a-d are represented, receive queue 258 may be divided into two or more logical queues.

As receive queue 258 is divided into a multiple logical queues, each processing core may be assigned to one or more logical queues. In some embodiments, each processing core is sequentially assigned to an equal number of logical queues such that each processing core processes a logical queue in order. For example, logical queues 260a-d may be assigned to processing cores 1-4 (not shown) such that processing core 1 processes data in queue 260a, then processing core 2 processes data in queue 260b, and so on. Once queue 260d is processed by processing core 4, processing core 1 begins processing the next sequential logical queue (not shown). Since each processing core is only responsible for processing (e.g., hashing and indexing) the data in receive queue 258 that falls within the region of its assigned logical queue(s), each processing core only needs to be concerned with the packets arriving within its assigned regions. This example is not intended to limit the embodiments in any way.

Figure 3:
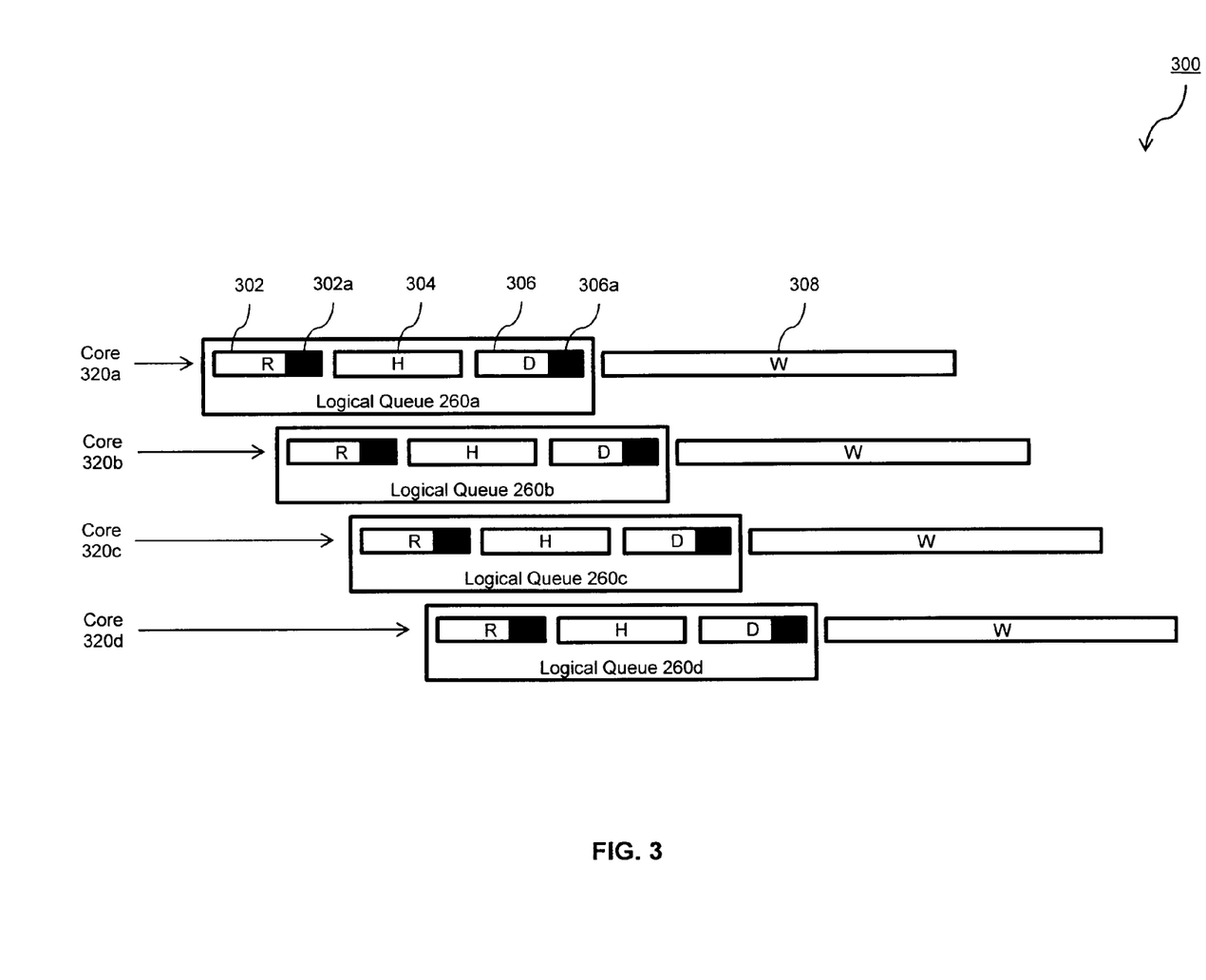
FIG. 3 illustrates an example process flow according to an embodiment.

FIG. 3 illustrates an example process flow 300 according to an embodiment that utilizes receive queue 258 in FIG. 2B. Process flow 300 is provided as an example and is not intended to limit the embodiments in any way. Process flow 300 includes cores 320a-d that each process packets in an assigned logical queue 260a-d according to the following stages.

In stage 302, core 320a takes ownership of a receive token, retrieves packets from its assigned logical queue (260a), updates tail 258b to point to the next subsequent logical queue (260b), and passes the receive token to the next assigned core (320b). Because logical queues 260a-d are part of receive queue 258, coordination among cores is employed to update tail 258b to the next logical queue since tail 258b is shared by all cores. To facilitate this coordination, a single receive token is passed between cores, represented as stage 302a.

Use of the receive token provides a number of benefits. First, it is used to signal to the next core that the current core has completed processing. Second, it is used to mutually exclude other cores from accessing logical queues out of turn so that packet ordering is maintained. Third, it is used to facilitate updating of tail 258b since tail 258b is a global data unit shared by all cores and is not updated by the NIC. Fourth, it prevents queue overflow by forcing each core to respect the gap time for each logical queue region.

In stage 302a, core 320a passes the receive token to core 320b, the core assigned to the next sequential logical queue (260b). In some embodiments, before passing the receive token, core 320a may update tail 258b to point to logical queue 260b. In other embodiments, updating tail 258b may be a time consuming operation and may be deferred until two or more logical queues have been processed. Once core 320b possesses the receive token, it may begin stage 302 on logical queue 260b, and so on.

In stage 304, core 320a classifies the packets received from logical queue 260a based on parsing the packet headers and calculating hash values. In stage 306, core 320a takes ownership of a dispatch token and dispatches the classified packets to a work queue according to the computed hash value assignment for the target processing core. The dispatch token serves a similar function to the receive token but mutually excludes other cores from dispatching classified packets to work queues. Once core 320a distributes the classified packets to work queues, core 320a advances the dispatch token to core 320b (stage 306a) so that packets that core 320b classifies during its stage 304 can be dispatched to work queues.

As each core completes processing packets received from their assigned logical queues in stages 302-306, each core continues processing the data contained in each of the packets in its respective work queues in stage 308 until an assigned logical queue is ready to provide packets to be hashed and dispatched.

The following equations describe some of the benefits of process flow 300 using receive queue 258. In a multicore processor of N cores, and a queue packet arrival rate of R, the packet arrival rate for each core can be expressed as:

$$\text{Packet Arrival Rate} = \frac{R}{N}$$

This example assumes that R is constant across receive queue 258, and an individual core N is only required to process packets within an assigned logical queue region every X descriptors, where X can be expressed as:

$$X = \text{Region Size} \times (N-1)$$

This introduces a gap time G for each processor that occurs when a processor is not required to process packets in an assigned logical queue. A portion of the gap time G is represented in process flow 300 as stage 308 where each processing core is free to process data from packets in their respective work queues. Gap time G can be reduced to a simple function of the number of cores N, expressed as:

$$G = R \times N \times \text{Region Size}$$

As an example, with a multicore processor of 8 cores, a logical queue region size of 32, and a packet arrival rate of 67 nanoseconds (64 byte packets on a 10 Gbps link), each core will have a gap time G of 17,152 nanoseconds which is calculated as:

$$G = 67 \times 8 \times 32$$

In this example with 32 packets for a given logical queue region size, each core N has 536 nanoseconds $$\left(\frac{G}{\text{Region Size}}\right)$$

to process each packet. This is a significant improvement over a single core processor as described in FIG. 2A receiving packets on a single queue with an arrival rate of 67 nanoseconds per packet.

Figure 4:
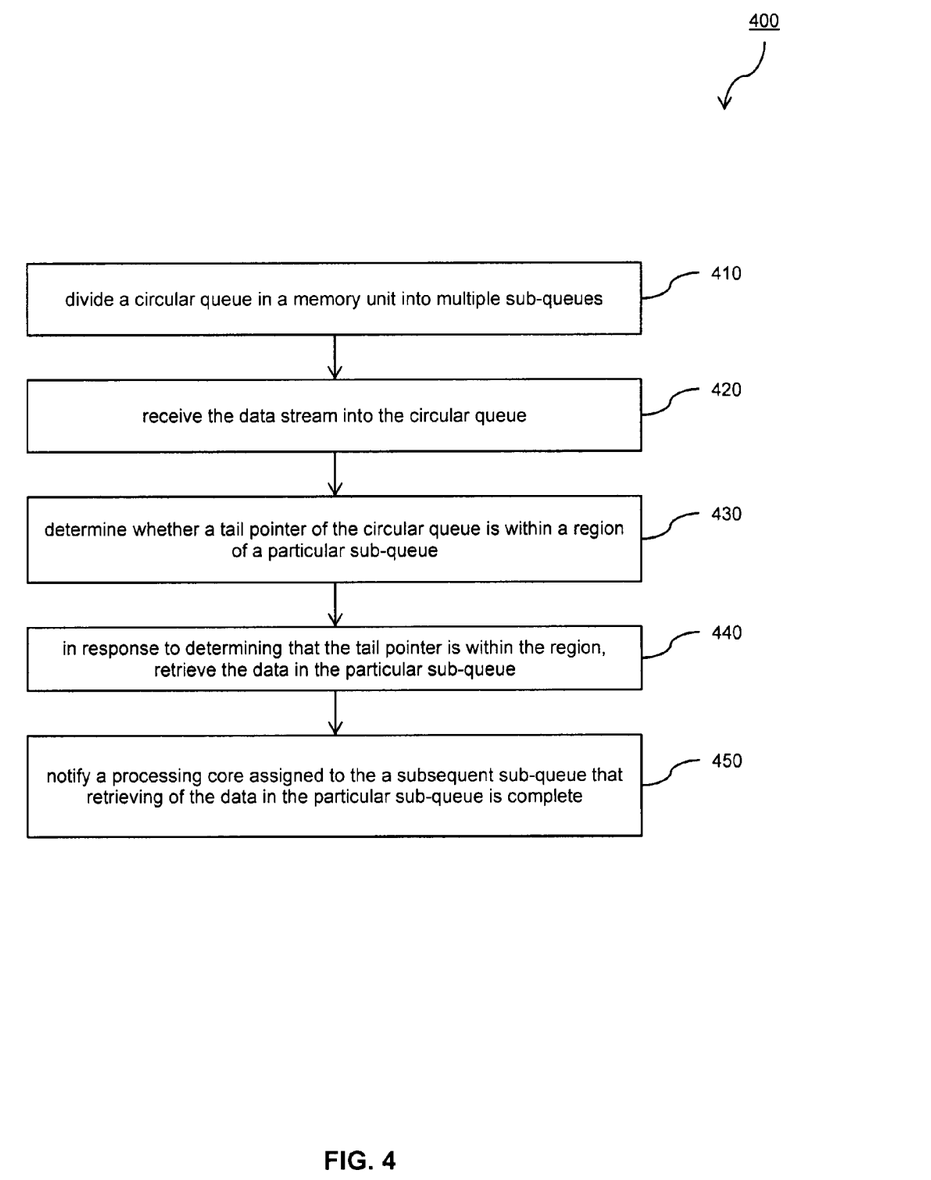
FIG. 4 illustrates an example method, adapted according to an embodiment.

FIG. 4 illustrates example method 400, adapted according to one embodiment. Method 400 may be performed by a computing device that receives data from a network such as, for example, a server system, a client computing device, a switch, or VoIP server.

Method 400 assumes that the computing device includes a multi-core processor or multiple individual processors. Method 400 also assumes that the computing device has a memory unit that receives packets from a network interface device into a circular queue.

At stage 410, the circular queue that receives network data is divided into multiple sub-queues or logical queues based on a multiple of the number of processing cores. For example, if the multi-core processor includes eight processing cores, the circular queue may be divided into 32 logical queues, four logical queues for each processing core. Each logical queue includes an equal portion of the circular queue and is sequentially assigned to a different processing core. For example, the first eight logical queues in the circular queue are sequentially assigned to processing cores one through eight, the next eight logical cores are sequentially assigned to processing cores one through eight, and so on until each logical queue is assigned to a processing core. Assigning logical queues to processing cores in this way provides each processing core with a substantially similar time gap between when it will be required to process data in an assigned logical queue.

At stage 420, the data stream is received into the circular queue. The data stream may be delivered as packets by a NIC or a similar device with access to the memory unit. As the data stream is inserted into the circular queue, a head pointer that indicates the top of the queue or the most recently added data is updated to reflect that data has been added. Since data is added to the circular queue by the NIC, the head pointer is updated by the NIC.

Stages 430, 440, and 450 occur as data is received in the circular queue.

In stage 430, a location of a tail pointer is determined. The tail pointer indicates the bottom of the circular queue and points to the part of the data stream that will be processed next. When the tail pointer points to a region within a particular logical queue, that logical queue is need of processing. The tail pointer is usually updated to point to the next logical queue to be processed once the current logical queue is processed, but in some embodiments the tail pointer may be updated after two or more logical queues have been processed. This may occur particularly where updating the tail pointer is an expensive operation. If updating of the tail pointer is deferred, other mechanisms such as, for example, a receive token may be used to control the order and processing of logical queues until the tail pointer is updated.

In stage 440, when the tail pointer is within a particular location range within the circular queue, data in the corresponding logical queue is retrieved and processed by the processing core assigned to the logical queue. The data may be processed by, for example, parsing packet headers and hashing portions of the packet headers to determine a work queue in which to dispatch the data. Once the data is processed, it may be dispatched to its determined work queue.

In stage 450, the processing core assigned to process the next subsequent logical queue is notified that the processing core currently accessing the circular queue has finished retrieving data from its assigned logical queue. This notification may occur while the processing core is processing the data it retrieved. This notification serves as an exclusion mechanism such that only the notified processing core will access the circular queue. This also notifies the next assigned processing core that is may begin retrieving data from its assigned logical queue. This notification continues as each processing core finishes retrieving data in its assigned logical queue.

Various embodiments may add, omit, rearrange, or modify the actions of method 400. For instance, method 400 refers to notifying the next assigned processing core that currently assigned processing core has completed its processing. To provide this notification, a receive token may be passed from the current processing core the next processing core. The receive token may indicate the currently active logical queue in cases where updating of the tail pointer is deferred.

Various embodiments may provide one or more advantages over conventional systems. For instance, various embodiments provide for the use of general purpose processors instead of specialized hardware. This reduces the cost of need specialized hardware.

When implemented via computer-executable instructions, various features of embodiments of the present disclosure are in essence the software code defining the operations of such various features. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

Figure 5:
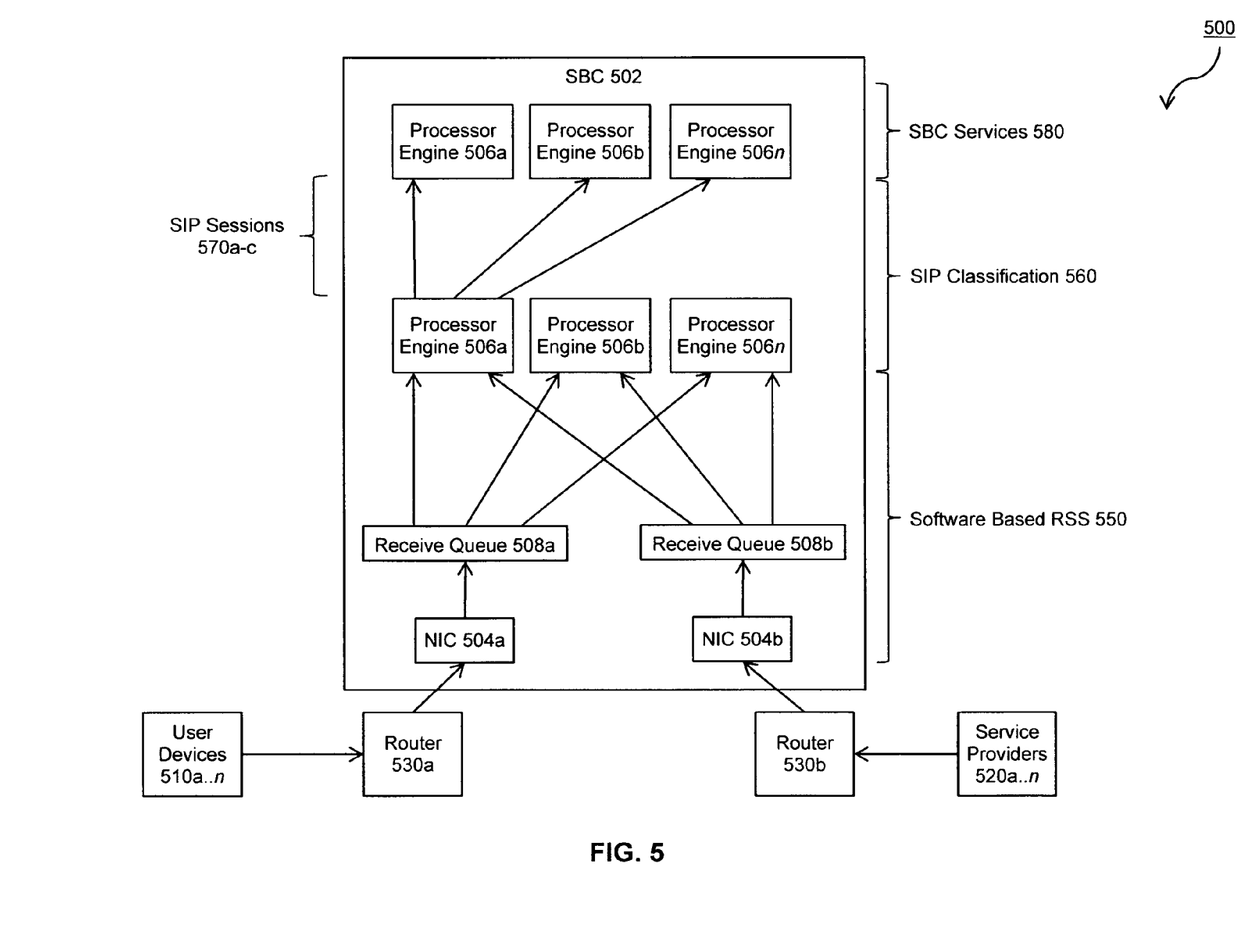
FIG. 5 illustrates an example system that utilizes the embodiments described herein.

FIG. 5 illustrates an example system 500 that utilizes the embodiments described herein. System 500 includes SBC 502, routers 530a-b, user devices 510a-n that connect to SBC 502 through router 530a, and service providers 520a-n that connect to SBC 502 through router 530b. SBC 502 is a SIP server system that include processor engines 506a-n that process data received by NICs 504a-b. SBC 502 also includes receive queues 508a-b according to the embodiments described in, for example, FIGS. 2B, 3, and 4.

SBC utilizes receive queues 508a-b with a software based RSS process 550. In RSS process 550, data is pushed into receive queue 508a by NIC 504a and data is pushed into receive queue 508b by NIC 504b. Receive queues 508a-b are divided into sub-queues or logical queues and each logical queue is assigned to one of processor engines 506a-n, as described above. Each processor engine 506a-n processes its part of receive queues 508a-b during RSS process 550. In this example, the data is classifies as shown by SIP classification 560 into SIP session 570a-c and dispatches to their corresponding processors engines 506a-n for further processing. When processor engines 506a-n are not processing their assigned portions of receive queues 508a-b, they are free to perform SBC services 580 for SIP sessions 570a-c.

Figure 6:
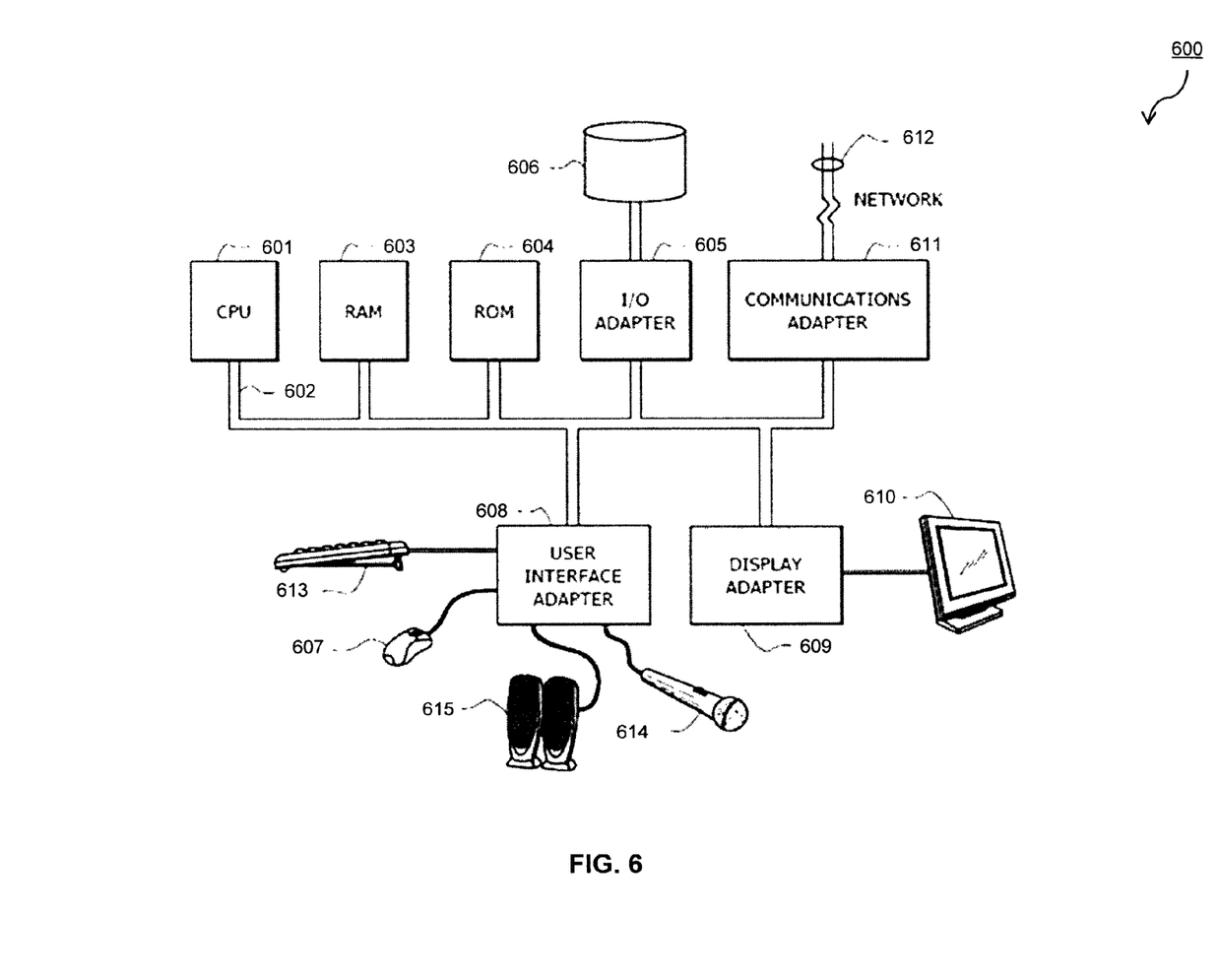
FIG. 6 illustrates an example computer system adapted according to an embodiment of the present disclosure.

FIG. 6 illustrates an example computer system 600 adapted according to one embodiment of the present disclosure. That is, computer system 600 comprises an example system on which embodiments of the present disclosure may be implemented (such as a computer acting as a network node and either producing or consuming a data stream). In another example, CPUs 110a-d, cores 320a-d, and processor engines 506a-n may be represented by different cores in a processor or even by different processors that are similar to CPU 601. In various embodiments, the computer-readable instructions may be tangibly written as hardware or as firmware. Thus, while some embodiments may include a computer similar to computer system 600 performing operations of FIGS. 2-4, other embodiments may include actions of FIGS. 2-4 performed at the level of abstraction of a CPU or the cores within a multi-core CPU.

Central processing unit (CPU) 601 is coupled to system bus 602. CPU 601 may be any general purpose or specialized purpose CPU. However, the present disclosure is not restricted by the architecture of CPU 601 as long as CPU 601 supports the inventive operations as described herein. CPU 601 may execute the various logical instructions according to embodiments of the present disclosure. For example, one or more CPUs, such as CPU 601, or one or more cores, may execute machine-level instructions according to the exemplary operational flows described above in conjunction with FIGS. 2-4.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold system data and programs.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable an administrator to interact with computer system 600 in order to input information to install new applications and keep the system running.

I/O adapter 605 preferably connects to storage device(s) 606, such as one or more of hard drive, compact disc (CD) drive, solid state drive, etc. to computer system 600. The storage devices may be utilized when system memory RAM 603 is insufficient for the memory requirements associated with storing data. Communications adapter 611 is preferably adapted to couple computer system 600 to communication link 612 (e.g., the Internet, a LAN, a cellular network, etc.). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, when interacting with an administrator.

In accordance with embodiments of the present disclosure, computer system 600 performs specific operations by CPU 601 executing one or more sequences of one or more instructions contained in system memory component 603. Such instructions may be read into system memory component 603 from another computer readable medium, such as ROM 604 or drive 606. In other embodiments, hard-wired circuitry may be used in place of (or in combination with) software instructions to implement the present disclosure.

Logic may be encoded in a computer readable, non-transitory medium. Such a medium may take many forms, including but not limited to, non-volatile media and volatile media. In various implementations, non-volatile media includes optical or magnetic disks, such as disk or solid-state drive component 606, and volatile media includes dynamic memory, such as system memory component 603. CPU 601 reads application code from the readable medium and executes the code to provide the described functionality.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer system configured to receive an incoming data stream, the system comprising:
   a multi-core processor;
   a memory unit at least partially configured in a circular queue that receives a data stream, wherein the circular queue is divided into a plurality of sub-queues, each sub-queue corresponding to a different memory region, and wherein each memory region is assigned to a different processing core of the multicore processor such that as data is read from a particular memory region covered by a particular sub-queue, the processing core assigned to the particular memory region processes the data, the processing core being assigned to the particular memory region before the data is received into the circular queue;
   wherein a head pointer of the circular queue is updated as data is received into the circular queue and a tail pointer of the circular queue is updated by the particular processing core assigned to the memory region at which the tail pointer is currently located as the particular processing core processes data from the memory region at which the tail pointer is currently located.

2. The system of claim 1, wherein the circular queue is divided into a plurality of sub-queues based on a multiple of the number of processing cores.

3. The system of claim 1, further comprising a memory location configured to store at least a receive token and a dispatch token, wherein the receive token is used to determine whether the particular processing core can process data in its assigned sub-queue, and wherein the dispatch token is used to determine whether the particular processing core can pass processed data in its assigned sub-queue to a work queue for further processing.

4. The system of claim 3, wherein the data in each sub-queue is hashed when its assigned processing core is in possession of the receive token.

5. The system of claim 1, wherein an assigned processing core hashes the data in its assigned sub-queue as the tail pointer moves through its assigned sub-queue.

6. The system of claim 1, wherein a processing core assigned to a particular sub-queue is configured to update the tail pointer to point to a next subsequent sub-queue after a plurality of sub-queues have been processed by their respectively assigned processing cores.

7. The system of claim 1, wherein the circular queue is configured to receive data from an operatively coupled network interface device, and wherein the network interface device updates the head pointer of the circular queue based on the amount of received data.

8. The system of claim 1, wherein each processing core is configured to process data in a work queue when the tail pointer is not pointing to an assigned sub-queue.

9. The system of claim 1, wherein the number of sub-queues is adjusted based on the rate at which data is received into the circular queue.

10. A computer-implemented method for receiving an incoming data stream comprising:
    dividing a circular queue in a memory unit into multiple sub-queues, each sub-queue including an equal portion of the circular queue, and wherein each of the sub-queues are sequentially assigned to a different one of a plurality of processing cores;
    receiving the data stream into the circular queue, wherein a head pointer indicating the front of the queue is updated based on an amount of data received into the queue;
    as data is received in the circular queue:
        determining whether a tail pointer of the circular queue is within a region of a particular sub-queue;
        in response to determining that the tail pointer is within the region, retrieving the data in the particular sub-queue, wherein the data is retrieved by the processing core assigned to a particular sub-queue, the processing core being assigned to the particular sub-queue before the data is received into the circular queue;
        updating the tail pointer with the particular processing core assigned to the region at which the tail pointer is currently located; and
        notifying a processing core assigned to a next subsequent sub-queue that retrieving of the data in the particular sub-queue is complete.

11. The method of claim 10, wherein the data comprises packets.

12. The method of claim 10, further comprising:
    maintaining a receive token that is used to determine whether a particular processing core can process data in its assigned sub-queue.

13. The method of claim 12, wherein the data in each sub-queue is hashed when its assigned processing core is in possession of the receive token.

14. The method of claim 10, further comprising:
    maintaining a dispatch token that is used to determine whether the particular processing core can pass processed data in its assigned sub-queue to a work queue for further processing.

15. The method of claim 10, wherein processing the data in the particular sub-queue includes hashing the data.

16. The method of claim 10, wherein notifying the processing core assigned to the next subsequent sub-queue includes updating the tail pointer to point to the next subsequent sub-queue after a plurality of sub-queues have been processed by their respectively assigned processing cores.

17. The method of claim 10, wherein notifying the processing core assigned to the next subsequent sub-queue includes updating the tail pointer to point to the next subsequent sub-queue after the data in the particular sub-queue is processed.

18. The method of claim 10, wherein the number of sub-queues is adjusted based on the rate at which data is received into the circular queue.

19. A computer program product having a non-transitory computer readable medium tangibly recording computer program logic for processing and incoming data stream, the computer program product comprising:
   code for dividing a circular queue in a memory unit into multiple sub-queues, each sub-queue including an equal portion of the circular queue, wherein the number of sub-queues is related to a number of processing cores in a computer processor coupled to the memory unit, and wherein the sub-queues are sequentially assigned to the processing cores;
   code for receiving the data stream into the circular queue, wherein a head pointer indicating the front of the queue is updated based on the amount of data received into the queue;
   as data is received in the circular queue:
      code for determining whether a tail pointer of the circular queue is within a region of a particular sub-queue;
      code for retrieving data in the particular sub-queue after determining that the tail pointer is within the region, wherein the data is retrieved by the processing core assigned to the particular sub-queue, the processing core being assigned to the particular sub-queue before the data is received into the circular queue;
      code for updating the tail pointer with the particular processing core assigned to the region at which the tail pointer is currently located;
      code for notifying a processing core assigned to a next subsequent sub-queue that retrieving of the data in the particular sub-queue is complete.

20. The computer program product of claim 19 further comprising code to update the tail pointer after data in a plurality of sub-queues has been processed.

\* \* \* \* \*